United States Patent [19]

Greber et al.

[11] 4,340,579

[45] Jul. 20, 1982

[54] PROCESS FOR PRODUCING MODIFIED ALUMINA HYDRATE CRYSTALS

[75] Inventors: Jorg F. Greber, Bonn; Gunter Winkhaus, Konigswinger, both of Fed. Rep. of Germany

[73] Assignee: Vereinigte Aluminium-Werke Aktiengesellschaft, Bonn, Fed. Rep. of Germany

[21] Appl. No.: 98,846

[22] Filed: Nov. 30, 1979

[30] Foreign Application Priority Data

Dec. 2, 1978 [DE] Fed. Rep. of Germany ....... 2852273

[51] Int. Cl.³ .................................................. C01F 7/02
[52] U.S. Cl. ..................................... 423/625; 524/430
[58] Field of Search .......................... 423/625; 252/448

[56] References Cited

U.S. PATENT DOCUMENTS

| | | | |
|---|---|---|---|
| 1,314,710 | 9/1919 | Sherwin | 423/625 |
| 1,943,786 | 1/1934 | Cowles | 423/625 |
| 1,953,201 | 4/1934 | Toslerud | 423/625 |
| 3,265,466 | 8/1966 | Mallard | 423/625 |
| 3,466,142 | 9/1969 | Hambly | 423/629 |
| 3,619,309 | 11/1971 | Faktor et al. | 423/625 |
| 3,653,937 | 4/1972 | Koenig et al. | 423/625 |
| 3,832,442 | 8/1974 | Emerson | 423/625 |
| 4,203,962 | 5/1980 | Lippman | 423/625 |

*Primary Examiner*—Herbert T. Carter
*Attorney, Agent, or Firm*—Darby & Darby

[57] ABSTRACT

The present invention relates to a modified form of alumina hydrate filler, thermosetting and thermoplastic compositions having improved workability and mechanical properties containing such filler and methods of manufacturing such modified alumina hydrate filler. More specifically, the invention provides for the admixture of modified alumina hydrate crystals with a resinous composition in which the individual alumina hydrate crystal edges are substantially rounded, have a mean crystal size of less than about 35 microns and less than about 0.1% by volume of alumina hydrate crystals have a diameter of less than 2 microns. The resulting compositions have improved viscosity properties and exhibit good bending strength and flame retardant characteristics.

8 Claims, No Drawings

4,340,579

PROCESS FOR PRODUCING MODIFIED ALUMINA HYDRATE CRYSTALS

BACKGROUND OF THE INVENTION (a) Field of the Invention

This invention relates to a modified form of alumina hydrate crystals, methods of producing such crystals and thermosetting and thermoplastic compositions containing these crystals which impart improved workability to said compositions and improved bending strength properties to cured products obtained therefrom.

(b) Prior Art

It is known to those skilled in the art that resinous materials such as, for example, unsaturated polyesters, urethanes, vinyls, etc., burn rapidly at comparatively low temperatures. In view of these properties, it is necessary to incorporate one or more flame retardant materials in resinous compositions designed for uses such as in clothing, laminates used in the home, etc. These flame retardants added to resinous materials cause a reduction in the burning ability of the ultimately cured resinous or plastic products made therefrom.

One of the most common flame retardant additives used is alumina trihydrate ($Al_2O_3 3H_2O$). This material has found wide application as a filler material in the plastics industry. Its principal applications are in such areas as rubber carpet backings, adhesives, glass-reinforced unsaturated polyester sanitary ware, appliance housings, molded electrical products, vanities, cross linked polyethylene insulation and cross linked acrylic wall panels. More detailed descriptions of the flame retardant characteristics of alumina hydrate, its properties and its application in the plastics industry can be found in the literature such as, for example, Woycheshin et al., "Handbook Fillers Reinforced Plastics", 1978, Chapter 14, pp. 237–249. Aluminum trihydrate appears to function as a flame retardant because the contained water molecules are liberated into the resin during burning. The heat of burning drives off the water vapor present and does so at a temperature that the liberated water absorbs heat generated during the burning, thereby reducing the rate of burning somewhat akin to quenching the flame.

Unfortunately, while alumina trihydrate is an excellent flame retardant, it is well known that its inclusion is resinous compositions results in a deterioration of some of the mechanical and/or chemical porperties of plastic compositions, particularly strength properties such as bending strength of the cured product and the workability (viscosity) of the uncured composition. The alumina trihydrate, heretofore used as a flame retardant, is commonly derived from the well-known Bayer process and is characterized by having a mean crystal diameter in the range of 40 to about 100 microns, with the individual crystals being sharp edged, strongly structured and fissured. It is also known in the art to use as a flame retardant Bayer process alumina trihydrate which has been ground to reduce the diameter of the crystals to a mean crystal diameter of about 25 microns or less. This grinding operation results in the alumina trihydrate crystals having substantially sharp corners and in a substantial amount of the alumina hydrate crystals being broken up into very fine fragments and a dust-fine abrasion, thereby producing ground alumina trihydrate wherein at least 1% by volume of the crystals have a diameter of less than 2 microns. These ground alumina trihydrate crystals, when incorporated into a resinous composition in substantial quantities desirable for achieving good flame retardant properties, cause a sharp rise in the viscosity of the resinous composition thereby making further processing of the composition impractical. Furthermore, it is also known that when sufficient quantity of these prior art ground alumina trihydrate crystals are incorporated into resinous compositions in order to achieve the desired flame retardant properties, curing of such compositions results in a substantial reduction in the bending strength properties of the cured product in comparison to a resinous product from which these ground alumina trihydrate crystals are absent. A similar deterioration of the bending strength properties of the cured resinous product results when coarser alumina trihydrate crystals having a mean crystal diameter of 40 to 100 microns are used.

SUMMARY OF THE INVENTION

It is an object of the present invention to overcome some of the drawbacks previously encountered when heretofore used alumina trihydrate crystals were incorporated into thermosetting and thermoplastic compositions.

It is a further object of the present invention to provide plastic products having excellent flame retardant properties by incorporation of modified alumina trihydrate crystals into thermosetting and thermoplastic compositions from which such products are manufactured.

Another object of the present invention is to provide thermosetting and thermoplastic compositions containing modified alumina hydrate crystals wherein said compositions have improved workability (reduced viscosity) properties thereby facilitating further processing of such composition by conventional means.

It is still a further object of the present invention to provide cured plastic products containing the modified alumina trihydrate crystals of the present invention which have improved bending strength and good flame retardant properties.

Further objects include methods of obtaining the modified alumina trihydrate crystals used in accordance with the present invention.

These and other objects of the present invention will be apparent from the following detailed description.

DETAILED DESCRIPTION OF THE INVENTION

The present invention incorporates "modified" alumina hydrate crystals in thermosetting and thermoplastic compositions in which the mean crystal size and surface structure of existing prior art alumina hydrate crystals have been modified. For the purposes herein, alumina hydrate refers to an alumina having the general formula $Al_2O_3 XH_2O$ where X is 1.5 to 3. The modified alumina hydrate crystals are characterized by having (i) a mean crystal diameter of less than about 35 microns and preferably in the range of about 8 to about 25 microns (ii) less than 0.1% by volume of the individual alumina hydrate crystals having a diameter of less than 2 microns and (iii) the edges of the individual crystals being substantially rounded and the crystal surfaces substantially smooth. The modified alumina hydrate crystals are further characterized by having the gibbsite crystal lattice structure.

The modified alumina hydrate crystals having the foregoing characteristics may be obtained by several routes. One process involves dissolving solid alumina hydrate derived from the well-known Bayer process, which are characterized by a mean crystal diameter of about 40 to about 100 microns and individual crystal edges which are substantially sharp, in an aluminum free caustic lye solution to obtain a suspension of the alumina hydrate in the caustic lye. The caustic lye solution is preferably maintained at a temperature between about 20° C. and 50° C. The concentration of the caustic lye is preferably in the range of 100 to about 200 g/liter. The alumina hydrate crystals are maintained in the caustic lye solution for a sufficient time to permit formation of the modified alumina hydrate crystals. Generally, maintaining the suspension for a period from 1 hour to 24 hours is considered satisfactory. The suspension is subsequently filtered by any conventional means such as a vacuum filter, and the recovered modified alumina hydrate cyrstals are removed from the filter cake and air dried. A description of this process for obtaining Bayer process alumina hydrate can be found in literature relating to methods of producing alumina hydrate such as in the text "Die Tonerde-Aluminum Oxide", by H. Ginsberg et al., 1964 (Walter De Gruyter & Co., Berlin) page 16-27; Woycheshin et al., supra. page 238.

An alternate method of producing the modified alumina hydrate crystals of the present invention involves using a Bayer process lye suspension as described at pages 17-20 of the Ginsberg et al text supra which is a mixture of caustic lye and alumina hydrate crystals having a mean crystal diameter of between about 40 to 100 microns as heretofore described. The lye solution may contain from 100 to 200 g/liter caustic lye and about 50 to 200 g/liter aluminum oxide. Such a mixture is stirred for a period of approximately 20 to 100 hours and converted to slightly supersaturated state by stirring over a period of at least 24 hours. The lye suspension is then heated to a temperature in the range of 85° C. to about 105° C. until it is transferred into an aluminum undersaturated solution. After maintaining the alumina hydrate in the suspension for a period of about 1 hour to 24 hours at a temperature in the range of about 85° C. to about 105° C., the suspension is separated by conventional means such as by centrifuging the solid matter from the lye solution. The recovered solid matter is modified alumina hydrate cyrstals, which are washed with water and dried at a temperature in the range of about 100° to about 150° C. The drying may be performed by any conventional means such as a revolving tubular kiln.

The thermosetting and thermoplastic materials useful in the present invention are any of those well-known materials in the plastic field to which alumina hydrate have been added to impart flame retardant properties. These compositions include unsaturated polyesters, acrylics, vinyls, nylons, acetals, amides, polyolefins, epoxies, polyurethanes, etc. Such materials and others are well known in the art. The preferred resinous compositions are unsaturated polyesters which comprise a class of soluble low molecular weight micromolecules which contain both carboxylic ester groups and carbon-carbon double bonds as receiving units along the main chain. Such resins are made from a dibasic acid or glycol, either or both of which can contain a carbon to carbon double bond, as well as an ethylenically unsaturated monomer. Examples of suitable polycarboxylic acids (including anyhydrides) are dibasic acids and anhydrides, such as maleic acids, fumaric acids, maleic anhydride, tetrabromophthalic anhydride, tetrahydrophthalic anhydride, phthalic anhydride, adipic acid, azelaic acid, isophthalic acid, terephthalic acid, 1,4,5,6,7 7-hexachlorbicyclo-(2,2,1)-5-heptene-2,3-dicarboxylic anhydride, malic acid, pimelic acid, suberic acid, sebacic acid, itaconic acid, citraconic acid and succinic acid.

As polyhydric alcohols there can be used for example ethylene glycol, trimethylpentanediol, propylated bisphenol A, dibromoneopentyl glycol, dipropylene glycol, diethylene glycol, neopentyl glycol, 3-butylene glycol, 1,2-butylene glycol, 1,5-pentanediol, triethylene glycol and higher polyhydric alcohols such as glycerine, pentaerythritol, etc.

The ethylenically unsaturated monomer can be for example styrene, vinyl toluene, e.g., o-vinyl toluene, p-vinyl toluene or m-vinyl toluene, methyl methacrylate dialkyl phthalate, trialkyl cyanurate vinyl acetate, alpha-methyl styrene, cyclopentadiene, vinylidene chloride, alkyl acrylates, e.g., ethyl acrylate, 2-ethylhexyl acrylate and methyl acrylate, 2,4-dichlorostyrene, methyl vinyl ketone, diallyl ether, allyl acrylate, divinyl benzene, allyl diglycolate, allyl maleate, ethyl methacrylate, allyl acetate, etc. The polyester resin may contain about 15 to 85%, and preferably at least 30% resin and the balance of the ethylenic monomer.

Specific examples of suitable polyester resins are polyethylene terephthalate, polyethylene isophthalate, poly-p-ethylene oxybenzoate, polyethylene-1,2-diphenoxyethane 4,4$^1$-dicarboxylate, and copolyesters, e.g., polyethylene terephthalate-isophthalate, etc.

Examples of other suitable resinous products in which the modified alumina hydrate of the present invention may be incorporated are described in Woycheshin et al., supra. pp. 243-46; U.S. Pat. Nos. 3,694,403; 3,936,403; 4,130,538; 4,147,690; 3,741,929; 3,677,999 and Swiss Pat. No. 588,521, the disclosures of which are incorporated herein by reference.

The quantity of modified alumina hydrate incorporated into the resinous compositions can be varied over a wide range. Generally, larger quantities of modified alumina hydrate provide better flame retardant but reduce the workability of the composition by increasing the viscosity. Preferably, the weight ratio of modified alumina hydrate to the thermosetting or thermoplastic resin is no greater than about 2.5:1 and preferably in the range of about 2 to 1 to about 1 to 1.5. The blending of the alumina hydrate with the resin composition can be carried out over a wide temperature range, preferably up to 150° C. However, temperatures between 150° 200° C. can be used if the blending is to be performed in a very short time period.

The thermosetting and thermoplastic compositions of the present invention containing the modified alumina hydrate crystals may be cured by conventional means well known in the plastics industry. Suitable catalysts for use in the curing process include benzoyl peroxide, methyl ethyl ketone peroxide, (bis(4-t-butylcyclohexyl)peroxycarbonate), acetyl peroxide, lauryl peroxide, cumene hydroperoxide, etc. Accelerators may also be incorporated in the thermoplastic composition such as, for example, cobalt in the form of a solution of cobalt octoate or cobalt naphthenate. The quantities of catalyst and accelerator used is generally in amounts of 0.001 to 0.1% by weight, based on the total weight of the composition. The compositions of the present invention may also contain conventional ingredients such as plastacizers, dyes, pigments, thickners, antistatics, etc.

The mixing or blending of the thermosetting and thermoplastic material and modified alumina hydrate crystals may be carried out by any desired means capable of uniformly mixing these materials. For example, the mixing can be performed in a drum blender, V-type blender, or other conventional mixing apparatus. For the purpose of obtaining a cured resinous material uniform mixing of the composition can be performed in a Banbury mixer, screw extruder mixing roll or other conventional mixing apparatus. The compositions of the present invention are suitable for forming into plastic products by numerous methods including pressing, injection molding, calendering, thermoforming, etc.

The following examples will serve to illustrate the invention more fully and practically.

EXAMPLE I

A quantity of 1 part by weight alumina trihydrate crystals having a mean crystal diameter of 65 microns obtained from the Bayer process is mixed with 2.68 parts by weight of a 30% solution of aluminum free sodium hydroxide at a temperature of 40° C. to obtain a suspension of 500 g. solid material per liter. The suspension is permitted to stand for four hours after which it is filtered through a filter cake and 0.86 parts by weight the solid alumina trihydrate crystals are recovered from the filter cake. The alumina trihydrate crystals are characterized by having a mean crystal diameter of 25 microns with less than 0.1% by volume of the crystals having a diameter less than 2 microns as measured with a Coulter counter. The edges of the individual alumina trihydrate crystals are found to be substantially rounded and to have substantially smooth surfaces.

EXAMPLE 2

A lye solution obtained from the Bayer process as described at pages 16 through 19 of the Ginsberg et al. text, supra. containing 140 grams per liter of aluminum free sodium hydroxide, and 140 grams per liter of aluminum oxide is stirred for forty-eight hours and brought into a slightly supersaturated state. The concentration of the aluminum oxide at the end of the stirring period is 80 g/liter. This lye solution is then heated to 100° C. which transforms the lye solution into an aluminum undersaturated solution. To this solution is added 0.4 parts by weight of Bayer process alumina trihydrate crystals having a mean crystal diameter of 65 microns, the edges of the individual crystals being characterized by being sharp and rough with less than 0.1% by volume of the Bayer process alumina trihydrate crystals, having a diameter below 2 microns, to provide a suspension containing 500 grams of solids per liter. After a period of three hours, this suspension is filtered through a vacuum drum filter and the solid alumina trihydrate recovered from the mother lye solution. The alumina trihydrate is washed on the filter and thereafter dried with hot air. The dried alumina trihydrate crystals have a mean crystal diameter of 25 microns and less than 0.1% by volume of the crystals have a diameter under 2 microns as measured by a Coulter counter. 84% by weight of the initial amount of alumina trihydrate are recovered. The edges of the crystals are found to be substantially rounded and to have substantially smooth surfaces.

EXAMPLE 3

A Bayer lye composition prepared in the manner described by Ginsberg et al., supra and containing 140 g/liter of caustic lye, 75 g/liter of aluminum oxide and 500 g/liter of alumina trihydrate crystals derived from the Bayer process having a mean crystal diameter of 67 microns as measured by Coulter counter. Twenty cubic meters of the foregoing Bayer lye composition having a temperature of 52° C. is pumped into a container capable of holding 25 cubic meters, and which is fitted with an agitator revolving at a speed of sixty revolutions per minute and coiled pipes which can be vapor heated. The Bayer lye compositions is heated to 98° C. within about 45 minutes by conducting vapor through the pipes inside the container. This suspension is stirred at 98° C. for an additional three hours. After this reaction period, the solid matter portion of the suspension is separated by centrifuging from the mother lye. There is isolated 7.9 metric tons of solid modified alumina trihydrate crystals which are washed with water and dried at 140° C. in an indirectly heated revolving tubular kiln. The modified alumina trihydrate crystals are found to have a mean crystal diameter of 24 microns with less than 0.1% by volume of the crystals having a diameter of less than 2 microns as measured by a Coulter counter. The edges of the individual crystals are found to be substantially rounded and to have substantially smooth sufaces.

EXAMPLE 4

A Bayer lye composition is prepared containing 135 g/liter of caustic lye, 73 g/liter of aluminum oxide and 600 g/liter of Bayer process alumina trihydrate crystals having a mean crystal diameter of 59 microns as measured by Coulter counter. A container with an agitator is filled with 150 cubic meters of the foregoing composition. The container is fitted with a pump which continuously draws out approximately 150 cubic meters per hour of the lye suspension to a vapor heated heat exchanger to raise the temperature of the lye suspension to 102° C. The heated lye suspension is then fed back to the container with the agitator which revolves at a speed of about sixty revolutions per minute which results in the temperature in the agitator container rising to 96° C. after three hours. At this temperature, the lye suspension in the container is stirred for an additional three hours and thereafter the suspension is pumped to a vacuum drum filter which separates the resulting modified alumina trihydrate crystals from the mother lye solution. The modified alumina trihydrate are washed on a vacuum filter with water and thereafter dried with hot air at 140° C. 67.5 metric tons of modified alumina trihydrate crystals are recovered, having a mean crystal diameter of 17.3 microns with less than 0.1% by volume of the modified alumina trihydrate crystals having a diameter of less than 2 microns as measured by a Coulter counter, the edges of the individual alumina trihydrate crystals are found to be substantially rounded and to have substantially smooth surfaces.

The Bayer composition used in this example was prepared in the same manner as described in Example 3.

The effect on the workability (viscosity) of a resin incorporating varying quantities of the modified alumina trihydrate of Example 4, identified as Composition A in Table 1, was compared with a commercial form of alumina trihydrate crystals obtained by grinding alumina trihydrate obtained from the Bayer process to provide crystals with a mean crystal diameter of 16.8 microns as determined by Coulter counter and about 0.15% by volume of such crystals having a diameter of less than 2 microns, identified as Composition B in Table 1. The resin and alumina trihydrate were mixed together by blending in a laboratory mixer (Herbst type) at room temperature for about ten minutes. The resin used in each of the tests shown in Table 1 below is an unsaturated polyester resin containing styrene as the ethylenically unsaturated monomer which is available from Bayer, AG and identified by the designation "N22". The viscosity was measured using a rotation viscosity meter identified as Haake RV2. The viscosity is measured in the unit "pascal-second" which is equal to 1,000 centipoise. The measurement of the viscosity followed the procedure described in DIN 53018 which is a standardized German test procedure for measuring viscosity established by the "Deutsches Institut fur Normung" (German Institute for Standardization).

The styrene based unsaturated polyester composition is cured using a 1% methyl ethyl ketone peroxide and 0.5% of cobalt octoate as an accelerator. A cured composition containing 1 part by weight of the modified alumina trihydrate of the present invention and 0.54 parts by weight of the foregoing unsaturated polyester resin, passes the requirements of flame test classification B1 described in DIN test number 4102, Part 1, which is a standardized test procedure in Germany for measuring flamability. The apparatus used in the test is represented by the drawings number 4 through 6 of this test procedure.

TABLE I

| Alumina Trihydrate (parts by wt.) | Resin (parts by wt.) | Viscosity (20° C.) (Composition A) | Viscosity (20° C.) (Composition B) |
|---|---|---|---|
| 1 | 1.5 | 6.1 | 10.1 |
| 1 | 1.0 | 9.0 | 19.8 |
| 1 | 0.67 | 24.5 | 243.0 |
| 1 | 0.54 | 44.1 | this mixture did not flow* |
| 1 | 0.43 | 141.7 | this mixture did not flow* |

*Composition cannot be further processed.

It is apparent from the foregoing Table that incorporation of the modified alumina trihydrate of the present invention into an unsaturated polyester resin provides mixtures having reduced viscosities that permit further processing of the admixture even when using substantial quantities of the modified alumina trihydrate, thereby resulting in a composition having improved workability properties. This reduced viscosity permits the incorporation of substantially greater quantities of the modified alumina trihydrate into thermosetting and thermoplastic resin compositions to impart good flame retardant properties to the subsequently cured product, in comparison to the use of ground alumina trihydrate (Composition B) as heretofore used in the prior art.

The superior properties of compositions containing the modified alumina trihydrate crystals of the present invention is demonstrated by the comparison tests which follow.

The composition identified as #1 in Table II was obtained by mixing one part by weight of alumina trihydrate prepared in accordance with the procedure described in Example 1, and characterized by a mean crystal diameter of 25 microns and less than 0.1% by volume of the crystals have a diameter of 2 microns with one part by weight of Bayer, AG unsaturated polyester resin "N22", measuring the viscosity of the mixture at 20° C. by DIN test procedure 53018 and curing the mixture in the same manner previously described for the composition which passed flame test procedure DIN 4102, Part 1, Classification B1.

The cured material is cut into a test piece of 10×10×120 mm dimensions and the bending strength is measured on this piece in accordance with DIN test procedure 53,452.

The composition identified as #2 in the Table below was prepared, cured and tested in the same manner as Composition #1, except that the modified alumina trihydrate of the present invention was replaced by one part by weight of alumina trihydrate crystals obtained from the Bayer process, having a mean grain diameter of 65 microns and less than 0.1% by volume of the crystals having a diameter of 2 microns. The composition identified as #3 in the Table was also prepared, cured and tested in the same manner as Composition #1, except that in place of the modified alumina trihydrate of the present invention, ground alumina trihydrate crystals were used having a mean crystal diameter of 25 microns and 1% of the crystals have a diameter of less than 2 microns.

TABLE II

| Composition # | Crystal Surface | Viscosity (20° C.) | Bending Strength (n/mm²) |
|---|---|---|---|
| 1 | smooth | 2.3 | 66 |
| 2 | rough | 2.2 | 54 |
| 3 | rough | 8.2 | 52 |

The foregoing Table II demonstrates that only Composition #1, containing the modified alumina hydrate crystals, provides good viscosity and improved bending strength properties. Composition #2, while having an acceptable viscosity, suffers from a reduction in bending strength and Composition #3 suffers from both a poorer viscosity and a reduction in the bending strength properties.

What is claimed is:

1. A process for producing modified gibbsite alumina trihydrate particles which comprises:
    stirring a Bayer process lye solution which contains caustic lye and dissolved aluminum oxide to obtain a slightly supersaturated solution and subsequently heating said solution to a sufficient temperature to convert it to an undersaturated state, adding to said undersaturated solution a predetermined amount of gibbsite alumina trihydrate crystals to form a suspension and maintaining said suspension for a sufficient time to convert said crystals to modified particles, said crystals having a mean crystal diameter of between about 40 and 100 microns and having substantially sharp edges and rough surfaces, said modified particles having a mean particle diameter of less than about 35 microns and less than about 0.1 percent by volume of said particles having a diameter of less than about 2 microns, said particles further having substantially rounded edges and smooth surfaces.

2. A process as described in claim 1 further comprising separating said particles from said suspension.

3. A process for producing modified gibbsite alumina trihydrate particles which comprises:
    providing a Bayer process lye composition containing from about 135 to about 140 grams per liter of caustic lye, from about 73 to about 75 grams per liter of aluminum oxide and from about 500 to 600 grams per liter of gibbsite alumina trihydrate crystals in a container, to form a suspension of undissolved crystals heating the suspension of undissolved crystals at a temperature between about 98° C. to about 102° C. for a predetermined period of time and agitating said heated suspension for a second predetermined period of time to form said modified particles, wherein said crystals have a mean crystal diameter between about 40 and 100 microns and have substantially sharp edges and rough surfaces and said modified particles have a mean particle diameter of less than about 35 microns with less than 0.1 percent by volume of said particles having a diameter of less than about 2 microns, said particles further having substantially rounded edges and smooth surfaces.

4. A process as described in claim 3 further comprising separating said particles from said suspension.

5. A process as described in claim 3 further comprising providing a composition including about 140 grams per liter of caustic lye, about 75 grams per liter of dissolved aluminum oxide, and about 500 grams per liter of Bayer process gibbsite alumina trihydrate, heating the composition to about 98° C. and stirring the heated composition at about 98° C. for about three hours to form the modified particles and separating said modified particles from said composition.

6. A process as described in claim 3 comprising providing a composition including about 135 grams per liter of caustic, about 73 grams per liter of aluminum oxide and about 600 grams per liter of Bayer process gibbsite alumina trihydrate, heating said composition to about 102° C. and then maintaining said composition at about 96° C. for about three hours, stirring said composition for an additional three hours at about 96° C. to form the modified particles and separating said particles from said composition.

7. A process for producing modified gibbsite alumina trihydrate particles which comprises:

providing a Bayer process lye suspension containing from about 100 to about 200 grams per liter of caustic and about 50 to about 200 grams per liter of dissolved aluminum oxide stirring the suspension to produce a suspension of aluminum hydroxide crystals in a slightly supersaturated Bayer process lye, heating said suspension to provide an aluminum undersaturated solution and maintaining the suspension for a predetermined period of time at a temperature between about 85° C. and 105° C. to convert said crystals to said particles, wherein said crystals have a mean diameter of between 40 and 100 microns and have substantially sharp edges and rough surfaces and said modified particles have a mean particle diameter of less than about 35 microns and less than about 0.1 percent by volume of said particles have a diameter of less than about 2 microns, said particles further having substantially rounded edges and smooth surfaces.

8. A process as described in claim 7 further comprising separating said particles from said suspension.

* * * * *